United States Patent
Jiang et al.

(10) Patent No.: US 12,338,012 B2
(45) Date of Patent: Jun. 24, 2025

(54) SYSTEM FOR RECOVERING AERIAL TARGET BY USING MECHANICAL ARM ACTUATOR IN NON-BEARING MODE

(71) Applicant: Jun Jiang, Guangdong (CN)

(72) Inventors: Jun Jiang, Guangdong (CN); Xuezhu Wang, Guangdong (CN)

(73) Assignee: Jun Jiang, Shenzhen (CN)

( * ) Notice: Subject to any disclaimer, the term of this patent is extended or adjusted under 35 U.S.C. 154(b) by 0 days.

(21) Appl. No.: 18/401,259

(22) Filed: Dec. 29, 2023

(65) Prior Publication Data

US 2024/0217683 A1 Jul. 4, 2024

(30) Foreign Application Priority Data

Jan. 2, 2023 (CN) .......................... 202310000319.3

(51) Int. Cl.
*B64U 70/30* (2023.01)
*B64F 1/02* (2006.01)

(52) U.S. Cl.
CPC .............. *B64U 70/30* (2023.01); *B64F 1/029* (2020.01)

(58) Field of Classification Search
CPC ................................ B64U 70/30; B64F 1/029
See application file for complete search history.

(56) References Cited

U.S. PATENT DOCUMENTS

| | | | | |
|---|---|---|---|---|
| 4,267,987 A * | 5/1981 | McDonnell | ............ | B64D 39/00 244/6 |
| 7,121,507 B2 * | 10/2006 | Dennis | ................... | B64U 30/12 244/116 |
| 7,175,135 B2 * | 2/2007 | Dennis | ................... | B64C 25/68 244/110 F |
| 8,172,177 B2 * | 5/2012 | Lovell | .................... | B64U 70/30 244/110 F |
| 8,944,373 B2 * | 2/2015 | Dickson | .................. | B64F 1/029 244/110 C |
| 9,527,603 B2 | 12/2016 | Allen et al. | | |
| 10,538,340 B1 * | 1/2020 | Roup | ..................... | B64U 70/30 |
| 11,745,897 B2 | 9/2023 | Brown et al. | | |
| 2009/0236470 A1 * | 9/2009 | Goossen | ................... | B64F 1/04 244/115 |
| 2011/0127378 A1 | 6/2011 | McDonnell | | |
| 2016/0011592 A1 * | 1/2016 | Zhang | ..................... | B60L 53/80 244/114 R |
| 2016/0251088 A1 * | 9/2016 | Melish | ................... | B64F 1/0295 244/110 C |
| 2017/0225784 A1 * | 8/2017 | Hayes | ....................... | B64D 5/00 |
| 2018/0162528 A1 * | 6/2018 | McGrew | ................. | B64C 25/68 |
| 2018/0327113 A1 * | 11/2018 | von Flotow | ........... | B65H 54/28 |
| 2023/0150668 A1 | 5/2023 | Allwein et al. | | |

FOREIGN PATENT DOCUMENTS

WO WO-2013055265 A1 * 4/2013 ........... B64C 39/024

* cited by examiner

*Primary Examiner* — Justin M Benedik

(57) ABSTRACT

The present disclosure relates to a system for recovering an aerial target by using a mechanical arm actuator in a non-bearing mode. The system includes: a hanging rack, a catcher, hung on the hanging rack and configured to catch a target; a guide arm, configured to guide the catcher to catch the target; a states observation apparatus, configured to observe a state of the target; and a controller, electrically connected to the states observation apparatus and the guide arm, where the controller obtains the state of the target through the states observation apparatus, and controls the guide arm to guide the catcher to catch the target in time.

19 Claims, 8 Drawing Sheets

SYSTEM FOR RECOVERING AERIAL TARGET BY USING MECHANICAL ARM ACTUATOR IN NON-BEARING MODE

CROSS-REFERENCE TO RELATED APPLICATION

The present application claims priority to Chinese Patent Application No. 202310000319.3, filed on Jan. 2, 2023, titled "MECHANICAL ARM NON-BEARING TYPE AERIAL TARGET RECOVERING SYSTEM", the entire contents of which are incorporated herein by reference.

TECHNICAL FIELD

The present disclosure belongs to the technical field of aerial target recovery, and particularly relates to a mechanical arm non-bearing type vertical take-off and landing air vehicle or a cargo recovering system carried thereon.

BACKGROUND

Vertical take-off and landing air vehicles, including traditional helicopters, a Multi-copter/multi-rotor air vehicles and vertical take-off and landing airplanes, often require special parking aprons and hangars as places for take-off and landing and maintenance. This mode requires large space and construction cost, which is particularly obvious in the parking and maintenance of ship-borne air vehicles. Nowadays, micro-small air vehicles have developed rapidly, especially, the multi-rotor helicopters have developed rapidly in the past 20 years and have penetrated into each field of people's daily life. The take-off and landing and maintenance modes of the "parking aprons" and the "hangars" have also been followed, for example, an unattended system designed for the Multi-copter aerial vehicles. CN110271686B and CN113212779A are typical applications that realize parking by the control ability of the aerial vehicle. This mode is relatively easy to implement, but will lead to large occupied space and low integration level of the system, thereby seriously limiting the potential application ability of the system. For example, according to an existing mobile platform take-off and landing and maintenance technology, one platform often can park one aerial vehicle, which is difficult to support the clustering work of gathering the aerial vehicles. Furthermore, the take-off and landing accuracy is limited by the control accuracy of the aerial vehicle, and the take-off and landing process is prone to environmental interference so as to fail. The patents CN109178744A, CN113602517B, CN111746815B, CN110154865B, CN 113022874 B and CN202210015187.7 adopt the system with this idea.

It is a relatively new idea to use a special docking apparatus to assist the aerial vehicle in take-off and landing and storage. At present, the technical solutions displayed in public data often have the following problems. As an intermediate idea of adopting "landing" and "docking" modes, the patent CN113276725A adopts a special docking mechanism to provide a parking place for the multi-rotor. However, the docking system does not have high dynamic movement ability, and docking is generally realized by the control ability of the multi-rotor. Due to the low control accuracy of the multi-rotor, it is difficult to ensure the success rate of parking in this mode. A mechanical arm is a high-cost precision device, and an important part forming the cost is a driving system of the mechanical arm. The current technology often adopts the mechanical arm actuators ability to directly bear all the loads of a recovered aerial vehicle, and the achievable system will inevitably cost a lot. For example, the patent CN110589007A adopts a large-sized mechanical arm to directly catch the recovered aerial vehicle, resulting in the problem of high cost. In addition, the current solution of using the mechanical arm does not adopt a docking system with sufficient tolerance, for example, the patent CN110606220A. It is determined based on the level of the current robot technology that this system is difficult to implement. Furthermore, under the condition of external disturbance, especially severe wind disturbance, it is difficult for a system designed for general situations to cope with the high dynamic movement caused by strong disturbance.

SUMMARY

In view of the above technical problem, the present disclosure provides a system for recovering an aerial target by using a mechanical arm actuator in a non-bearing mode, for solving at least one technical problem in the prior art.

According to the system for recovering an aerial target by using a mechanical arm actuator in a non-bearing mode provided by the present disclosure, the aerial target includes a vertical take-off and landing air vehicle or a cargo carried on the vertical take-off and landing air vehicle. The system is configured to recover the target, and includes:
  a hanging rack;
  a catcher, hung on the hanging rack and configured to catch a target;
  a guide arm, configured to guide the catcher to catch the target;
  a states observation apparatus, configured to obtain the states of the target; and
  a controller, electrically connected to the states observation apparatus and the guide arm,
  where the controller obtains the states of the target through the states observation apparatus, and controls the guide arm to guide the catcher to catch the target in time.

Compared with the prior art, the present disclosure has the following advantages:
  the recovering reliability is high. According to the present disclosure, the mechanical arm serves as a dynamic or kinetic guide apparatus before docking, and the load of the mechanical arm is a catcher which is very light relative to the recovered aerial vehicle or the cargo carried thereon, so the mechanical can track a recovered airplane or a cargo carried thereon with high dynamics and high control accuracy.
  The docking reliability is relatively high. Due to the adoption of a special docking mechanism with a certain tolerance, the docking reliability of the system is relatively high. In particular, under the condition of strong disturbance, such as air turbulence, the proposed active catcher makes the system have the advantage of relatively high docking reliability.
  The cost is low. The mechanical arm actuators in the present disclosure only bears the catcher, and the weight of the catcher is often one or two orders of magnitude less than that of the recovered aerial vehicle or the cargo carried thereon. Therefore, the ability requirements of a driver and a transmission apparatus, which account for an important proportion of the cost of the mechanical arm are greatly reduced.
  The integration level and the portability are high. Compared with a recovering system in other existing schemes, the mechanical arm used in the scheme greatly reduces the volume due to the low load, thereby having better folding potential and portability. In addition, the recovered aerial vehicle can be subjected to space optimization operations, such as folding, by the mechanical arm and the storage device. Therefore, the system has small occupied space, high integration level and high portability.

The optimization of the recovered aerial vehicle is facilitated. Since this scheme generally adopts docking from a part above the aerial vehicle, so that the space under the aerial vehicle is effectively released. For most applications, the space under the aerial vehicle is usually used for mounting various devices. Furthermore, the aerial vehicle is docked and transferred by special devices in the recovering process, so an undercarriage of the aerial vehicle can be canceled. In summary, the device is favorable for the optimization of the recovered aerial vehicle.

DESCRIPTION OF REFERENCE NUMERALS

Figure 1:
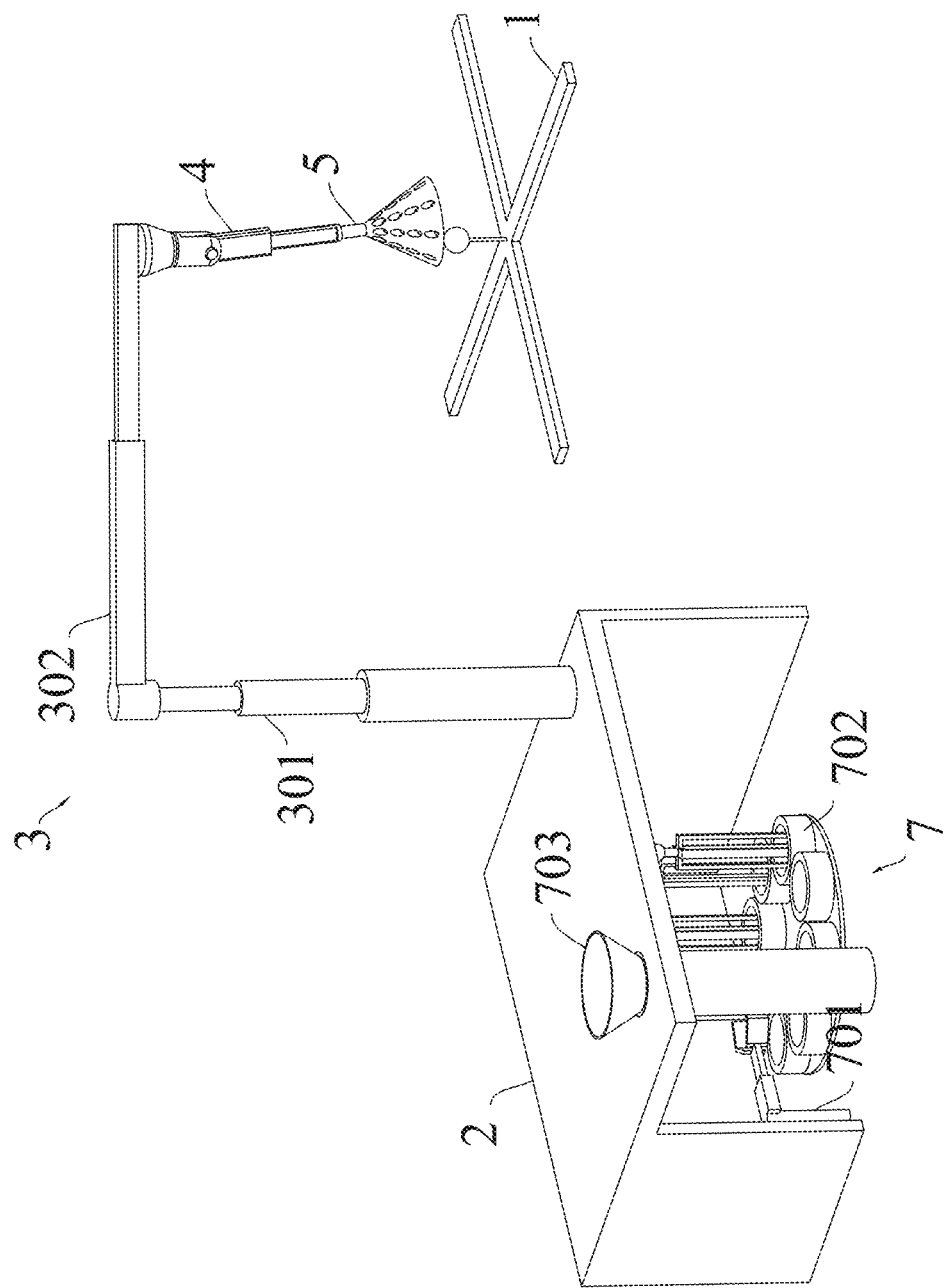
FIG. 1 is a schematic diagram of Embodiment 1.

1—mission aerial vehicle; 101—clamping apparatus; 2—carrier; 3—hanging rack; 301—upright column; 302—cross beam; 4—guide arm; 401—bearing cable; 5—catcher; 51—passive catcher; 511—rod body; 512—self-locking mechanism; 52—active catcher; 521—shell; 522—spring; 523—limiting block; 524—impact portion; 6—recovering apparatus; 601—recovering cable; 602—cable driving apparatus; 603—catcher; 7—storage system; 701—transfer apparatus; 702—storage position; 703—storage channel; 8—cargo.

DETAILED DESCRIPTION OF THE EMBODIMENTS

The present invention will be described in detail below with reference to the accompanying drawings and embodiments. Each example is provided by way of an explanation of the present invention, not a limitation of the present invention. In fact, those skilled in the art will recognize that modifications and variations can be made in the present invention without departing from the scope or spirit of the invention. For example, features shown or described as part of one embodiment may be used in another embodiment to produce yet another embodiment. Therefore, it is intended that the present invention includes such modifications and variations as come within the scope of the appended claims and their equivalents.

In the description of the present invention, the orientations or positional relationships indicated by the terms "longitudinal", "transverse", "upper", "lower", "front", "rear", "left", "right", "vertical", "horizontal", "top", "bottom", etc. are based on the orientations or positional relationships shown in the drawings, and are only for the convenience of describing the present invention, rather than requiring that the present invention must be constructed and operated in a specific orientation, so they cannot be interpreted as limitations to the present invention. The terms "linked", "connected" and "arranged" used in the present invention should be understood in a broad sense, for example, it can be a fixed connection or a detachable connection, it can be directly connected or indirectly connected through an intermediate component, and it also can be a cable connection, a radio connection or a wireless communication signal connection. Those of ordinary skill in the art can understand the specific meanings of the above terms in the present invention according to specific situations.

One or more examples of the present invention are illustrated in the accompanying drawings. The detailed description uses number and letter signs to refer to features in the accompanying drawings. Similar or like reference signs in the drawings and descriptions have been used to refer to similar or like parts of the present invention. As used herein, the terms "first", "second", "third" and the like are used interchangeably to distinguish one member from another and are not intended to denote the location or importance of individual members.

The system is applied to an unattended system or a surface-based recovering system of a carrier recovering mission aerial vehicle. The unattended system or the surface-based recovering system here provides supply and parking devices for the mission aerial vehicle, which is also referred to as a carrier for short. The carrier may be arranged on a fixed place or a fixed facility required by a mission, or may move along with the surface-based carrier to provide more flexible support for the mission aerial vehicle in space. The surface-based carrier here includes, for example, a vehicle moving on the ground, a ship moving on the water surface, and a submersible capable of floating to the water surface. Of course, the carrier may also be the ground or a fixed object on the ground. When the mission aerial vehicle is recovered, the system is docked with the mission aerial vehicle through the guide arm with high accuracy and high dynamic control ability. Then, the system realizes accurate recovery and storage. When the mission aerial vehicle performs the mission, the system takes the mission aerial vehicle out of the storage place to take off. Each part and the mission aerial vehicle of the system are folded when necessary to effectively utilize the space of the carrier.

Embodiment 1

Referring to FIG. 1, in this embodiment, a carrier of the system includes a base station with a rectangular outline.

The system includes a hanging rack 3 with an inverted L-shaped configuration. The hanging rack 3 includes an upright column 301 and a cross beam 302 arranged at the top of the upright column 301. The hanging rack is mounted on the base station and provides physical support for lifting a mission aerial vehicle 1. In some embodiments, the cross beam 302 and the upright column 301 are connected through a rotary driving apparatus, so that the cross beam 302 can rotate around the axis of the upright column 301. In some embodiments, the tail end of the cross beam 302 and the upright column 301 can reciprocate in respective length directions, thereby better controlling a hung object. At each working stage of the system, the cross beam 302 is placed at an appropriate position to provide more flexible support for the hanging rack 3, thereby facilitating the recovery and storage of the mission aerial vehicle 1 and the storage of the hanging rack 3. Of course, the rotary driving apparatus may be arranged at the joint of the upright column 301 and the base station to drive the whole hanging rack to rotate, and at this time, the cross beam 302 is fixedly connected to the upright column 301.

The system further includes a guide arm 4. The guide arm 4 includes a multi-degree-of-freedom mechanical arm with dynamic control ability. In this embodiment, the guide arm 4 adopts an RRP configuration. The guide arm 4 is hung below the cross beam 302. The fixed end of the guide arm is arranged on the cross beam 302, and a catcher 5 is mounted at the free end of the guide arm. Depending on the high dynamic movement ability and high control accuracy of the mechanical arm, the guide arm 4 enables the catcher 5 located thereon to effectively track the expected states before and during the implementation of the catching action, in particular, the expected position and expected posture of the catcher 5, and drives or release the catcher 5 in time to catch the mission aerial vehicle 1. In some embodiments, the guide arm 4 is movably arranged on the hanging rack 3 to provide more flexible dynamic support for the hanging rack. For example, a guide rail and a sliding base slidingly arranged on the guide rail are arranged on the hanging rack 3, and the sliding base is electrically connected to the controller. The fixed end of the guide arm 4 is connected to the sliding base, so that the guide arm 4 can move along the guide rail.

The system further includes a states observation apparatus. The states observation apparatus is configured to measure the movement states, including the posture, of the mission aerial vehicle 1. The states observation apparatus can be flexibly mounted at a position convenient for states observation, including but not limited to: on the guide arm 4, on the catcher 5, on the carrier, on the body of the mission aerial vehicle 1, and at the combination of the above positions. The states observation apparatus may be a device for directly obtaining the relative states of an observed object. For example, the states observation apparatus adopts optical measurement based devices, which is usually a monocular, binocular or multi-ocular camera and visual mode to perform identification and measurement through machine vision. The states observation apparatus may be a device for obtaining the relative states according to radar, millimeter wave, ultrasonic positioning, satellite positioning and the like. The states observation apparatus may also be a states observation device and algorithm combining with an inertial sensor and a combined navigation system of the mission aerial vehicle 1 and integrated with multiple sensors implemented by the above positioning method. In some embodiments, an identification point is arranged on the mission aerial vehicle 1, and the identification point facilitates the identification and measurement of the states observation apparatus.

The system further includes a controller. The controller guides the guide arm 4 through data fed back by the states observation apparatus to adjust the state of the catcher 5 to catch the mission aerial vehicle 1. The controller is mainly configured to run a control algorithm and issue an execution instruction according to the obtained feedback data and information of other parts. The controller includes one or more of an independent controller of the system, a controller of the mission aerial vehicle 1, a controller of an aerial carrier and a controller outside the system. The execution algorithm of the controller includes but not limited to an algorithm not considering aerial carrier dynamics and only considering recovering system dynamics, an algorithm comprehensively considering dynamics of a complex multi-rigid body composed of the recovering system and the aerial carrier, and an algorithm comprehensively considering the comprehensive dynamics of the carrier, the recovering system, the mission aerial vehicle 1 and the link environmental disturbance. The mode of executing the algorithm may be centralized calculation by a certain independent controller, may be distributed calculation by controllers distributed in different parts, or may be calculation by an external server.

In the present disclosure, the core function of the guide arm 4 is to drive the catcher 5, so that the guide arm can track the expected state of the catcher 5 given by the controller, thereby maximally making up the states' difference between the mission aerial vehicle 1 and the carrier, and smoothly docking the catcher 5 and the mission aerial vehicle 1. Before docking, the load of a servo drive of the guide arm 4 is only the catcher 5. After stable docking, the guide arm 4 enters a passive working state in time, the guide arm 4 naturally droops under the mission aerial vehicle 1 and the action of the weight of the mission aerial vehicle, and the weight of the mission aerial vehicle 1 is borne by a structural member of the mechanical arm and the cross beam 302. In this case, the guide arm 4 acts as a suspension rope, and the maximum bearing capacity depends on the material of the mechanical arm. The strength of the material is usually several orders of magnitude greater than the bearing capacity of a rigid driving unit. Therefore, compared with the scheme in the prior art that a target aerial vehicle is directly grabbed and transferred by a mechanical arm, the weight of the guide arm 4 in this scheme may be far less than the weight of the mechanical arm in the traditional method. At this time, the phased mission of recovery of the mission aerial vehicle 1 has been completed.

After catching is completed, the mission aerial vehicle 1 can be taken down, transferred and stored manually by using a corresponding auxiliary apparatus after the mission aerial vehicle 1 is in a relatively stable state. In some embodiments, after catching is completed, the mission aerial vehicle 1 may be transferred by rotating the cross beam 302. At this time, the servo drive of the guide arm 4 is still in the passive working state. After the mission aerial vehicle 1 is transferred above a set position, the hanging rack 3 or the guide arm 4 is driven to gently drop the mission aerial vehicle 1, the catcher 5 releases the mission aerial vehicle 1 in time, and the transfer and storage of the mission aerial vehicle 1 can be completed. The transfer and storage of the mission aerial vehicle 1 may be further completed by the storage system after the catcher 5 releases the emission aerial vehicle 1.

The passive working state of the guide arm 4 means that the guide arm 4 bears the load without depending on the bearing capacity of the driver thereof, or does not bear the load. The passive working state of the guide arm includes: the load is separated from the guide arm 4, and the guide arm actuator or driver 4 does not bear the load; and the load straightens the guide arm 4, and the guide arm 4 bears the load only by the structure and material strength thereof. On this basis, the guide arm 4 adjusts the movement states of the guide arm 4 within the limited driving capacity range thereof, thereby improving the recovery efficiency. For example, a preset control algorithm may be executed to cooperate with recovery, for example, damping is provided to reduce the swing amplitude of the mission aerial vehicle 1 in the air and shorten the swing time, thereby improving the accuracy and efficiency of the recovery process.

Embodiment 2

Figure 2:
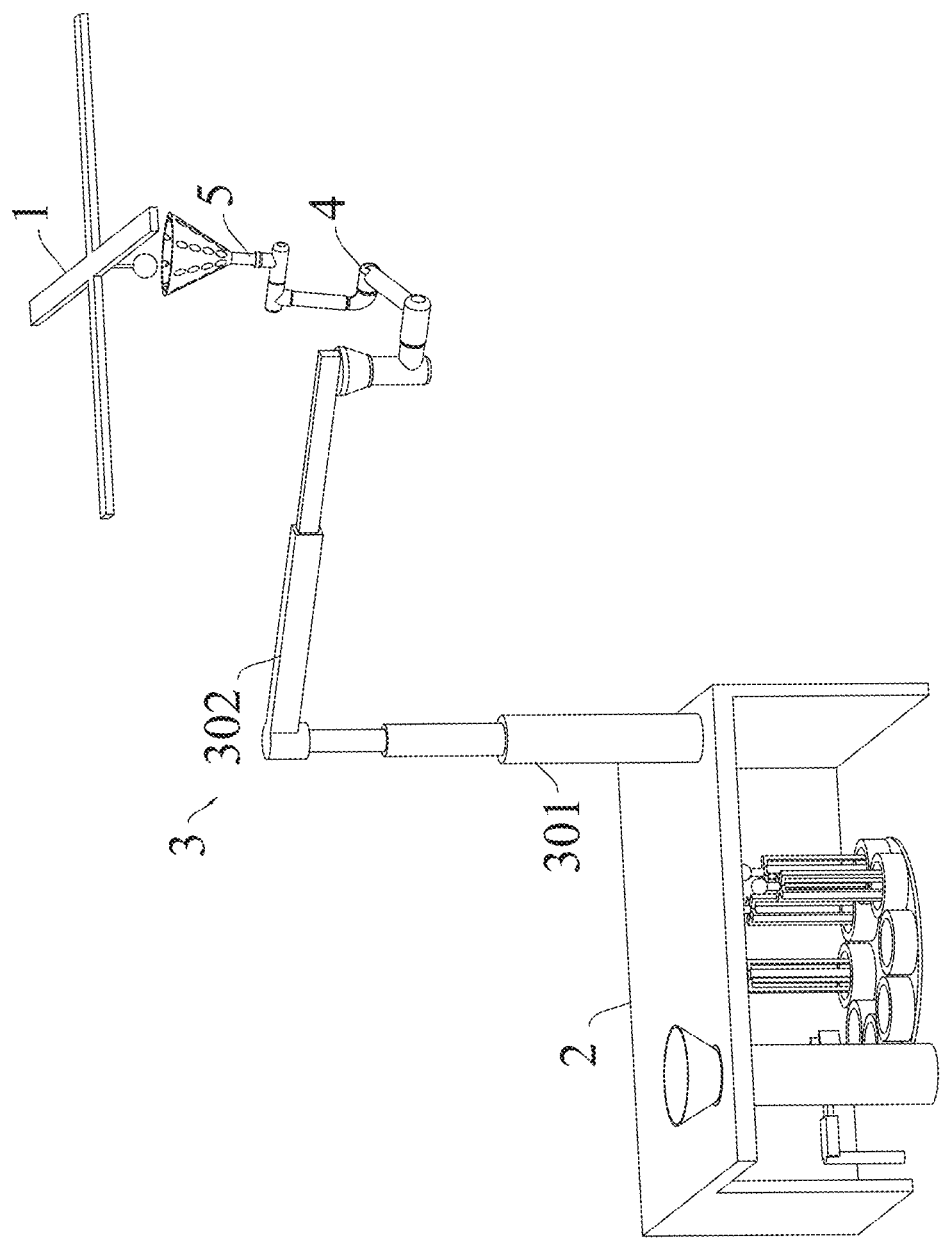
FIG. 2 is a schematic diagram of Embodiment 2.

Based on the above embodiment, a mechanical arm with more degrees of freedom may be used to achieve a more flexible catching form. As shown in FIG. 2, the mission aerial vehicle 1 is located above the cross beam 302, the guide arm 4 adopts a mechanical arm with a free end with more flexible 5-degree of freedom, and the guide arm 4 may be arranged above the cross beam 302, or may be, as shown in the figure, arranged below the cross beam 302. After the mission aerial vehicle 1 flies to a confluence above the cross beam 302, the guide arm 4 drives the catcher to catch the mission aerial vehicle 1 in time. After the catcher reliably locks the mission aerial vehicle 1, the guide arm 4 releases the driver thereof to enter a passive working state, and the mission aerial vehicle 1 can move the mission aerial vehicle and the guide arm 4 by the power thereof to a position below the cross beam 302; or according to the control algorithm that ensures the safety of the servo drive, the guide arm 4 guides the mission aerial vehicle 1 until the mission aerial vehicle 1 moves to a position below the cross beam 302 and continues to complete a subsequent recovery process. In some embodiments, the form of the guide arm 4 may be an RRP type mechanical arm according to a specific system construction requirement, where a root shaft of the RRP type mechanical arm is mounted upwards, or a root shaft of the RRP is mounted in an extending direction of a tail end of the cross beam 302; or the form of the guide arm may be a mechanical arm in other cascade forms; or the form of the guide arm may be a parallel mechanical arm meeting requirements; or the form of the guide arm may be a combination of cascade and parallel mechanical arm. In some embodiments, considering that the guide arm 4 moves to generate a load on a rotary driver of the cross beam 302, the cross beam 302 and the carrier may be controllably and fixedly connected to bypass the driver to realize direct force conduction. In this way, the mechanical arm may keep the relative position between the cross beam 302 and the carrier unchanged during movement, and a rotary driving apparatus is not stressed.

A plurality of mission aerial vehicles 1 are recovered in parallel. In some embodiments, a hanging rack 3, a guide arm 4 mounted on the hanging rack 3, and a catcher 5 mounted at the free end of the guide arm 4 form a recovering unit. A plurality of recovering units may be provided to improve the parallel recovery efficiency of the plurality of mission aerial vehicles 1. The plurality of recovering units complete the recovering missions of the plurality of mission aerial vehicles 1 cooperatively and in parallel. Of course, in some embodiments, the recovering unit may only include a cross beam 302, a guide arm 4 on the cross beam 302, and a catcher 5 on the guide arm 4. A plurality of recovering units are arranged on an upright column 301 when necessary. The plurality of recovering units complete the recovering missions of the plurality of mission aerial vehicles 1 cooperatively and in parallel.

Embodiment 3

Figure 3:
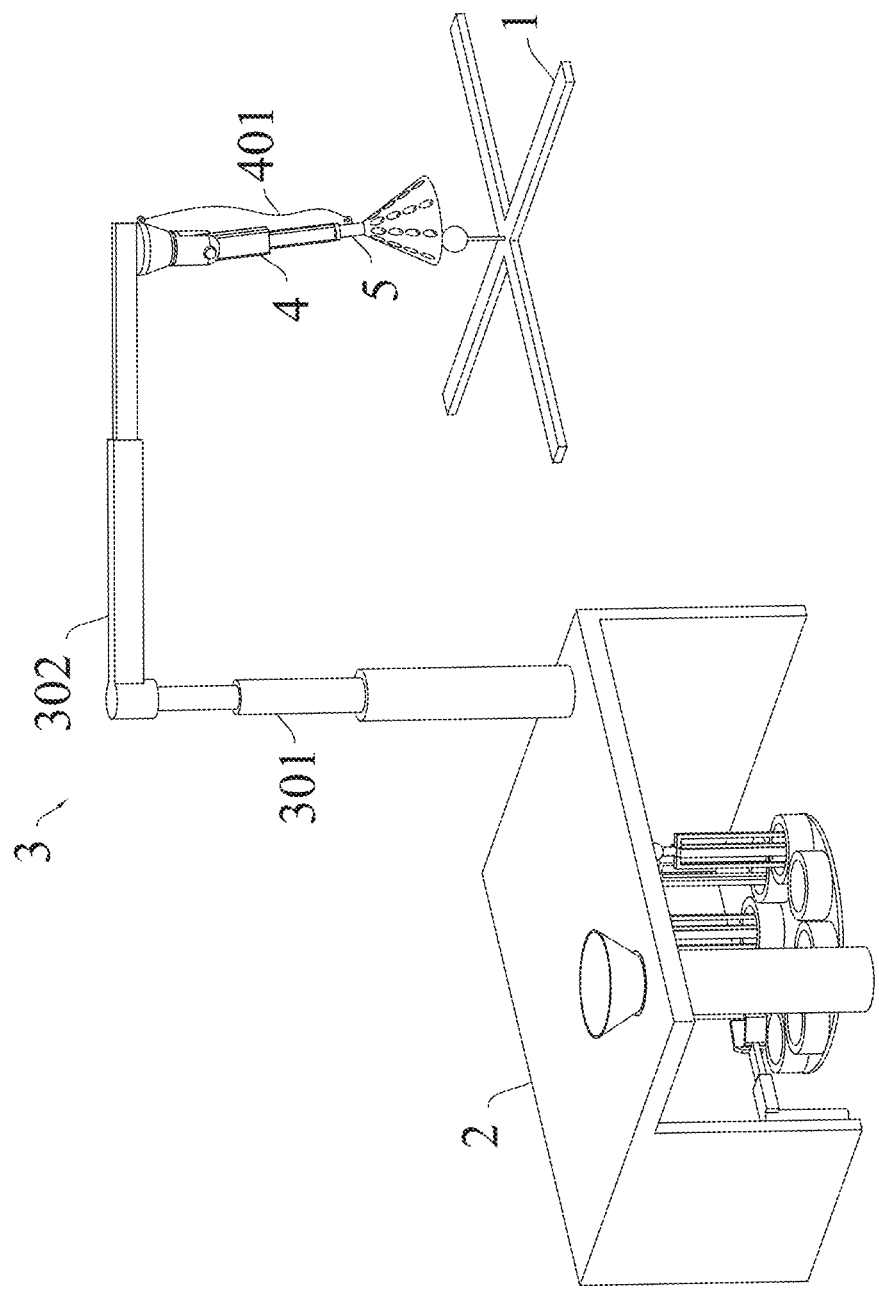
FIG. 3 is a schematic diagram of Embodiment 3.

Referring to FIG. 3, this embodiment is further implemented based on Embodiment 1. A bearing cable 401 is arranged on a side surface of the guide arm 4, a length of the bearing cable is not greater than the length of the guide arm 4 when tensioned, one end of the bearing cable is connected to a fixed end of the guide arm 4 or the hanging rack 3, and the other end of the bearing cable is connected to a tail end of the guide arm 4 or the catcher 5. The function is that after the catcher 5 is docked with the mission aerial vehicle 1, the weight of the mission aerial vehicle 1 is borne by a bearing cable 401 and/or the guide arm 4 in a passive working state, so that the load of the guide arm 4 is reduced, and the guide arm can be further lightened.

Embodiment 4

Figure 4:
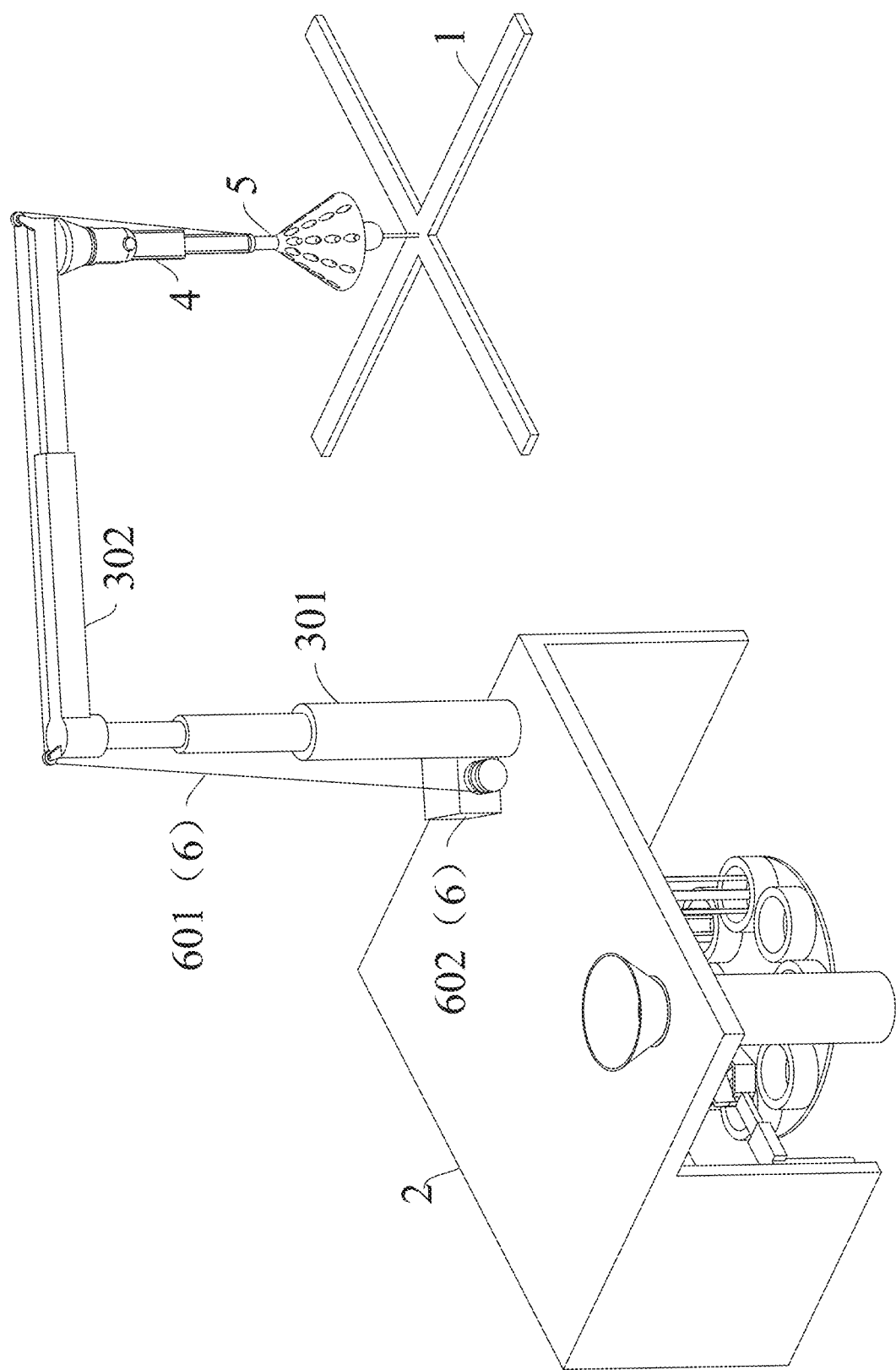
FIG. 4 is a schematic diagram of Embodiment 4.

Referring to FIG. 4, this embodiment is further implemented based on Embodiment 1.

The system includes the hanging rack 3, the state observation apparatus and the controller in Embodiment 1.

The system further includes a recovering apparatus 6. The recovering apparatus 6 includes a recovering cable 601, a cable driving apparatus 602 and a catcher 5. The cable driving apparatus 602 may be implemented by a winch. One end of the recovering cable 601 is connected to the cable driving apparatus 602, and the other end of the recovering cable is connected to the catcher 5. Several guide pieces are arranged on the hanging rack 3. The recovering cable 601 goes around the guide pieces on the hanging rack 3 to hang the catcher 5 on the cross beam 302 of the hanging rack 3. In this embodiment, the guide pieces adopt fixed pulleys arranged on the cross beam 302. After the catcher 5 catches the mission aerial vehicle 1, the cable driving apparatus 602 retracts or releases the recovering cable 601, so that the aerial vehicle moves to an appropriate height. In this embodiment, the cable driving apparatus 602 is arranged at the bottom of the upright column 301 of the hanging rack 3, and the cable driving apparatus 602 may be arranged at a relatively appropriate position when necessary. For example, the cable driving apparatus 602 may be directly arranged on the cross beam 302; or as mentioned below, the hanging rack 3 only has the cross beam 302, the cross beam 302 is mounted on an existing facility, and at this time, the cable driving apparatus 602 may be arranged on the cross beam 302, or may be arranged on the existing facility.

In some embodiments, the recovering apparatus 6 is movably arranged on the hanging rack 3 to provide more flexible dynamic support for the hanging rack. For example, a guide rail and a sliding base slidingly arranged on the guide rail are arranged on the hanging rack 3, and the sliding base is electrically connected to the controller. The cable driving apparatus 602 is connected to the sliding base, so that the recovering apparatus 6 can move along the guide rail.

The system further includes the guide arm 4 with the same performance as that in Embodiment 1, and the fixed end of the guide arm is still arranged on the cross beam 302. Different from the guide arm 4 in Embodiment 1, a jointing apparatus jointed with the catcher 5 is arranged at the free end of the guide arm 4, and the jointing apparatus completes the fixed connection and release between the guide arm 4 and the catcher 5 in time. The jointing apparatus may be jointed with the catcher 5 through a clamp or electromagnetic mode or an adsorption mode, which is implemented by a clamp in the embodiment of the present application.

In this embodiment, the core function of the guide arm 4 is to drive the catcher 5 in the recovering apparatus 6, so that the guide arm can track the expected state of the catcher 5 given by the controller, thereby maximally making up the state difference between the mission aerial vehicle 1 and the carrier, and smoothly docking the catcher 5 and the mission aerial vehicle 1. After the catcher 5 is docked with the recovered mission aerial vehicle 1, the clamp at the tail end of the guide arm 4 can choose to release the catcher 5 or assist the recovering cable 601 in optimizing the control on the mission aerial vehicle 1 according to the actual application scenario, for example, damping is provided to reduce the swing amplitude of the mission aerial vehicle 1 under the recovering cable 601 and shorten the swing time. Subsequently, the mission aerial vehicle 1 is recovered by the recovering apparatus.

In this embodiment, before the catcher 5 is docked with the mission aerial vehicle 1, the load of the guide arm 4 is only the catcher 5. After docking, the weight of the mission aerial vehicle 1 is borne by the catcher 5, the recovering cable 601 and the cross beam 302. In the subsequent recovery process, the guide arm 4 releases the catcher 5 in time. The servo drive of the guide arm 4 enters the passive working state, or the guide arm 4 is recovered to a state that does not affect the subsequent mission, for example, the guide arm 4 may be folded autonomously. When the servo drive of the guide arm 4 is in the passive working state, a preset control algorithm may still be executed to cooperate with recovery. In the recovery process of this embodiment, the maximum load borne by the guide arm 4 is equivalent to only the catcher 5. Therefore, based on Embodiment 1, the guide arm 4 in this embodiment may be further lightened.

In the above scheme of this embodiment, the mission aerial vehicle 1 will appear above the cross beam 302. After the mission aerial vehicle 1 enters a confluence position, the guide arm 4 carries the catcher 5 to move above the cross beam 302. After the catcher completes the catching in time and realizes stable docking, the mission aerial vehicle 1, the catcher 5 and the guide arm 4 move together below the cross beam 302 to complete the subsequent recovery process.

This embodiment will also involve the parallel recovery of a plurality of mission airplanes.

For the parallel recovery, in some embodiments, the parallel recovery scheme in Embodiment 1 may be adopted. The hanging rack 3, and the recovering apparatus and the guide arm 4 which are arranged on the hanging rack 3 are set as a recovering unit, and a plurality of recovering units complete the recovering missions of the plurality of mission aerial vehicles 1 cooperatively and on parallel.

In addition, for parallel recovery, in some embodiments, a plurality of cross beams 302 are arranged on one upright column 301, a recovering apparatus 6 and a guide arm 4 are arranged on each of the cross beams 302, each of the cross beams 302, and the recovering apparatus 6 and the guide arm 4 on the cross beam 302 form an independent recovering unit, and a plurality of recovering units complete the recovering missions of the plurality of mission aerial vehicles 1 cooperatively and in parallel.

Furthermore, for parallel recovery, in some embodiments, a plurality of recovering apparatuses 6 may be arranged on the cross beam 302 of the hanging rack 3, and the catchers 5 of the plurality of recovering apparatuses 6 are reasonably distributed and hung on the cross beam 302. After the mission aerial vehicle 1 arrives at a preset position, the guide arm 4 is jointed with an appropriate catcher 5 and catches the mission aerial vehicle 1. After the catcher 5 is docked with the recovered mission aerial vehicle 1, the clamp at the tail end of the guide arm 4 can choose to release the catcher 5 or assist the recovering cable 601 in optimizing the control on the mission aerial vehicle 1 according to the actual application scenario. In a case that the guide arm 4 chooses to release the catcher 5, the guide arm 4 can be docked with other catchers 5 to implement the catching missions of other mission aerial vehicles 1 while the recovering apparatus recovers the current mission aerial vehicle 1. Of course, when necessary, a guide rail and a sliding base slidingly arranged on the guide rail are arranged on the cross beam 302, and the sliding base is electrically connected to the controller. The fixed end of the guide arm 4 is connected to the sliding base, so that the guide arm 4 can move along the guide rail, and the guide arm 4 can be jointed with the relatively appropriate catcher 5 to complete the recovery mission of the mission aerial vehicle 1.

In addition, for parallel recovery, in some embodiments, an annular guide rail and several sliding bases slidingly arranged on the guide rail are arranged on the cross beam 302, and the sliding bases are electrically connected to the controller. A recovering apparatus 6 is arranged on each of the sliding base, and a cable driving apparatus of the recovering apparatus 6 is fixedly mounted on each of the sliding bases. After the parallel recovery mission is started, one of the recovering apparatuses 6 moves to a set position, and the guide arm 4 is jointed with the catcher 5 of the recovering apparatus. After the mission aerial vehicle 1 arrives at the set position, the guide arm 4 guides the catcher 5 to catch the mission aerial vehicle 1. After the catcher 5 is docked with the recovered mission aerial vehicle 1, the clamp at the tail end of the guide arm 4 can choose to release the catcher 5 or assist the recovering cable 601 in optimizing the control on the mission aerial vehicle 1 according to the actual application scenario. After the guide arm 4 releases the catcher 5, the current recovering apparatus 6 moves to the set position. Meanwhile, another recovering apparatus 6 moves to the set position to implement the recovery mission of the subsequent mission aerial vehicle 1.

Embodiment 5

Figure 5:
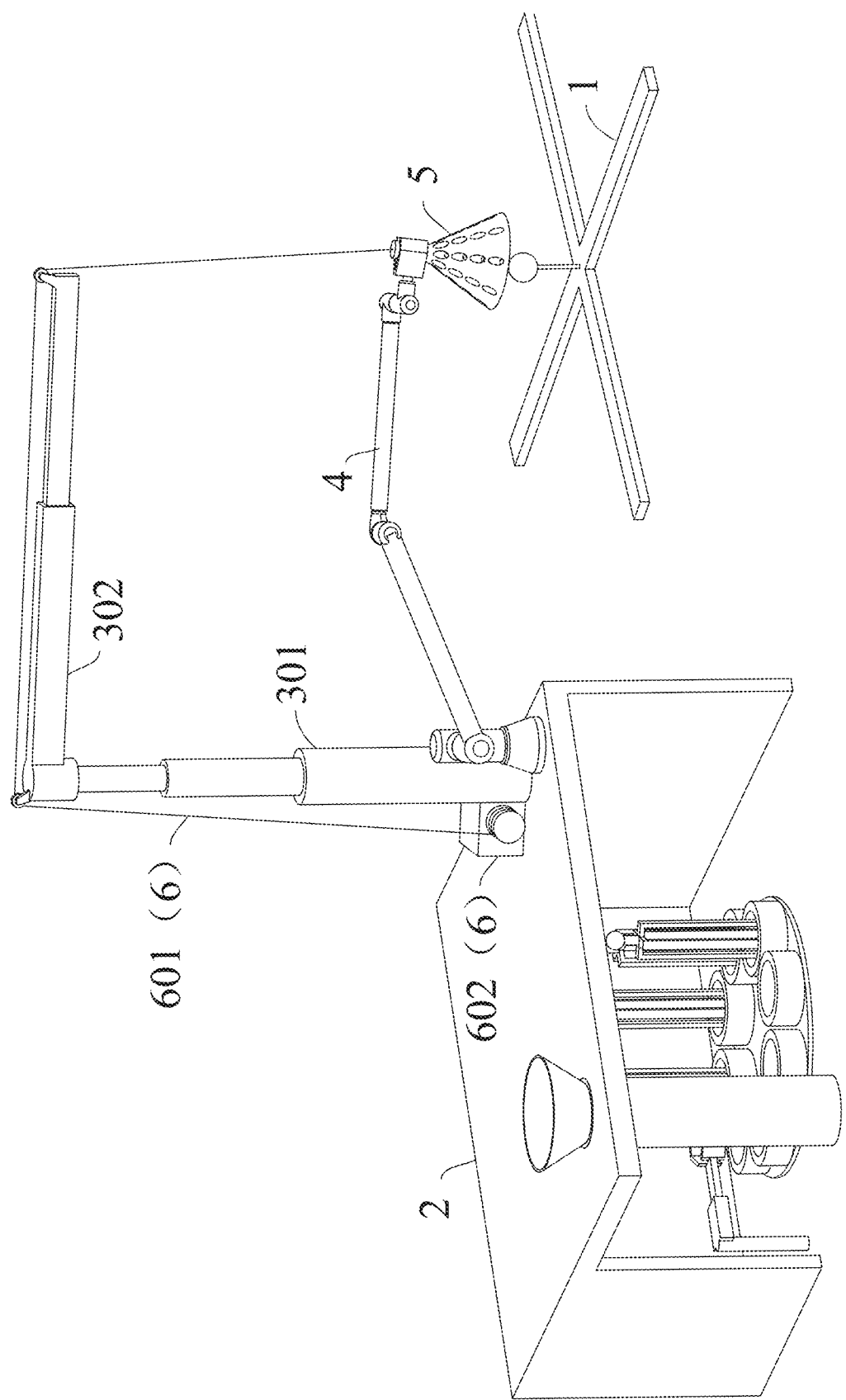
FIG. 5 is a schematic diagram of Embodiment 5.

Referring to FIG. 5, based on Embodiment 2, the fixed end of the guide arm 4 in this embodiment is mounted on a base station below the cross beam 302. The recovery process of the mission aerial vehicle 1 is the same as that in Embodiment 2, which will not be repeated herein.

Embodiment 6

Figure 6:
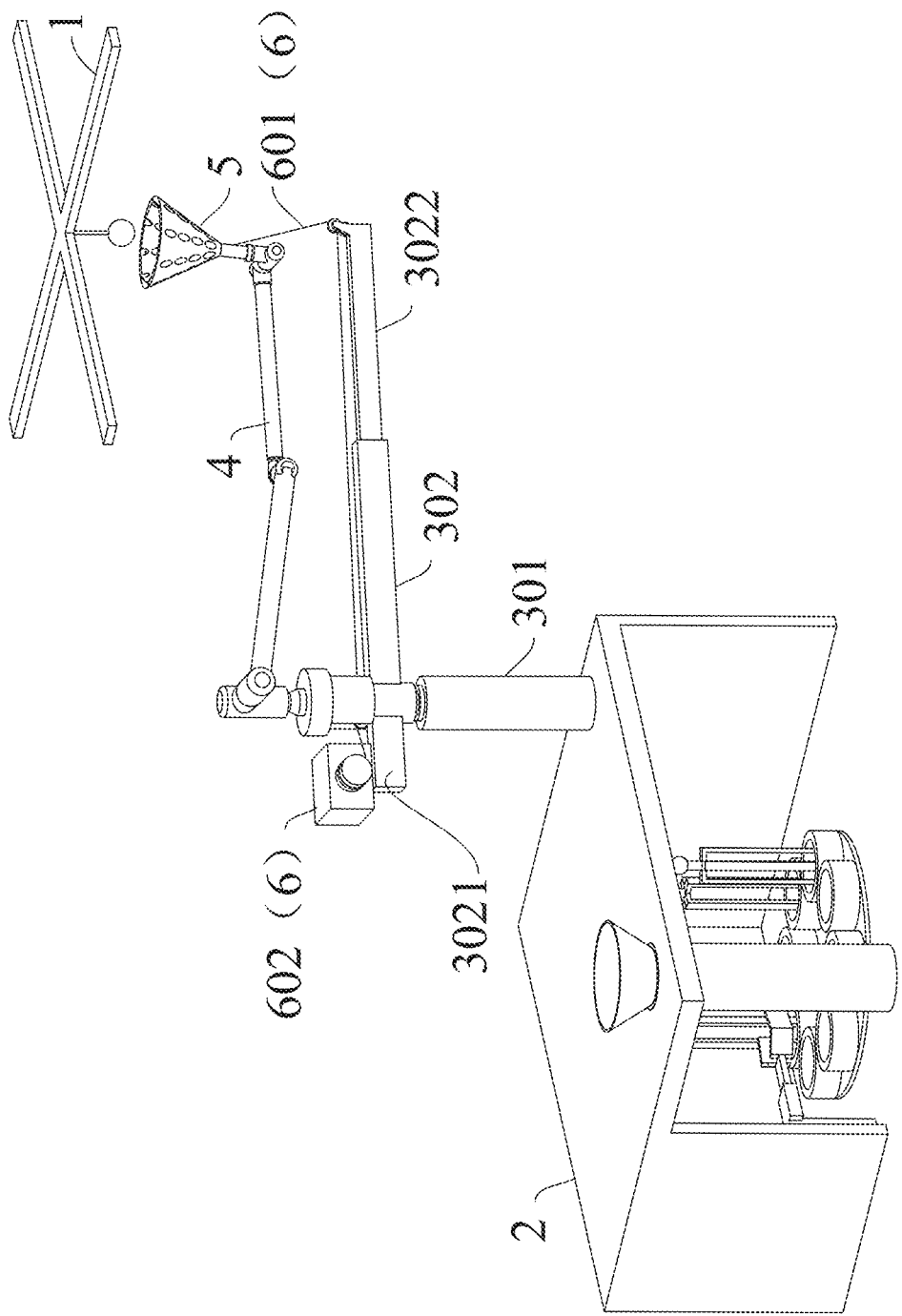
FIG. 6 is a schematic diagram of Embodiment 6.

Referring to FIG. 6, based on Embodiment 3, the fixed end of the guide arm 4 in this embodiment is mounted on a base station, and the cross beam 302 is arranged below the guide arm 4. The hanging rack 3 includes an upright column 301 and a cross beam 302. The cross beam 302 is arranged at an upper portion of the upright column 302. A distal part 3021 of the cross beam 302 is located at a left side of the upright column 301, and a proximal part 3022 of the cross beam 302 is located at a right side of the upright column 302. The guide arm 4 is arranged on a top of the upright column 301. A tail end of the guide arm 4 is arranged with a catcher 5 and configured to guide the catcher 5 to catch the target. The cable driving apparatus 602 is arranged at the distal part 3021 of the cross beam 302 of the hanging rack 3. A first end of the recovering cable 601 is connected to the cable driving apparatus 602, and a second end of the recovering cable 601 is connected to an outer wall of the catcher 5. After the mission aerial vehicle 1 enters a confluence position, the guide arm 4 carries the catcher 5 to catch the mission aerial vehicle 1. After the catcher 5 and the mission aerial vehicle 1 are docked and locked, the guide arm 4 releases the catcher 5 in time, the mission aerial vehicle 1 can move the mission aerial vehicle and the catcher 5 together by the power thereof to a position below the cross beam 302; or according to the control algorithm that ensures the safety of the servo drive, the guide arm 4 guides the mission aerial vehicle 1 until the mission aerial vehicle 1 moves below the cross beam 302. The subsequent recovery process is the same as that in Embodiment 3.

In the above embodiments of the present application, a storage system 7 may be provided and is configured to transfer and store the recovered mission aerial vehicle 1. Taking FIG. 1 as an example, the storage system 7 is arranged in the carrier, and includes at least one storage position 702 and a transfer apparatus 701 for transferring the recovered mission aerial vehicle 1 to the storage position, and the storage system 7 is electrically connected to the controller. In some embodiments, the transfer apparatus 701 includes at least one multi-degree-of-freedom transfer mechanical arm, and a transfer clamp arranged at the free end of the transfer mechanical arm. After the system transfers the mission aerial vehicle 1 to the set position, the transfer mechanical arm transfers the mission aerial vehicle 1 through the transfer clamp to an idle storage position 702 of the storage system 7, and fixes the mission aerial vehicle 1 at the storage position 702 through a fastening apparatus at the storage position 702. For example, a fastening clip and a rope are used for fastening. In some embodiments, for the convenience of storage, the mission aerial vehicle 1 can be folded autonomously, and the mission aerial vehicle 1 can be folded through a folding mechanical and driving device thereof. This mode is usually achieved through wired and wireless communication between the carrier and the mission aerial vehicle 1. The mission aerial vehicle may be passively folded. For example, a funnel-shaped storage channel 703 is formed above an appropriate position of the storage system 7 under the assistance and gravity of the catcher 5 and the structure and driving of the mission aerial vehicle 1, when the mission aerial vehicle 1 passes through the storage channel 703, the body of the mission aerial vehicle is passively folded when the diameter of the storage channel 703 is gradually reduced. After passing through the storage channel 703, the mission aerial vehicle 1 is transferred by the storage system 7 to complete storage. When the mission aerial vehicle 1 is required to perform a mission, the storage system 7 takes out the mission aerial vehicle 1 at the storage position 702 and transfers the mission aerial vehicle to an appointed take-off position. The catcher 5 is docked with the mission aerial vehicle 1 and takes out the mission aerial vehicle, the aerial vehicle can extend autonomously or extend automatically without restraint. The mission aerial vehicle 1 starts a flight program, and the catcher 5 is separated from the mission aerial vehicle and starts to perform the mission.

In each embodiment of the present application, the catcher 5 has different design schemes or working modes when being implemented under different conditions. Specifically, the catcher includes an active catcher 52 and a passive catcher 51, for active catching and passive catching. For example, when the action accuracy and movement ability of the guide arm 4 can meet the relative movement dynamics of tracking the mission aerial vehicle 1, the catcher 5 can work in a "passive" mode, may use the passive catcher 51, or may use the active catcher 52; and in some application scenarios, the dynamic control ability of the guide arm 4 cannot track the mission aerial vehicle 1. In this case, the active catcher 52 may be used, has independent active movement ability, and is configured to catch the dynamic mission aerial vehicle 1 with higher movement capability than that of the guide arm 4, thereby increasing the success rate of catching. For example, the active catcher 52 has rapid movement ability, the rapid movement ability and the tolerance ability of the catcher can perform compensation for the deficiency of the high dynamic tracking control ability of the guide arm 4, thereby achieving the catching ability under the high dynamic condition. In a case that the dynamic state of the catcher meets the catching condition, the controller sends a signal to the catcher, and the catcher rapidly rushes to the mission aerial vehicle 1 to complete the catching. This mode can improve the efficiency and reliability of the catching and docking operation. In this case, the catcher works in an "active" mode. A locking mechanism in the catcher is triggered by mechanical or electrical signals. When the catcher catches the mission aerial vehicle 1, a sensor or mechanical switch signal is triggered, and the trigger signal is sent to the locking mechanism by the controller or directly, so that the locking mechanism can be locked rapidly.

Figure 7:
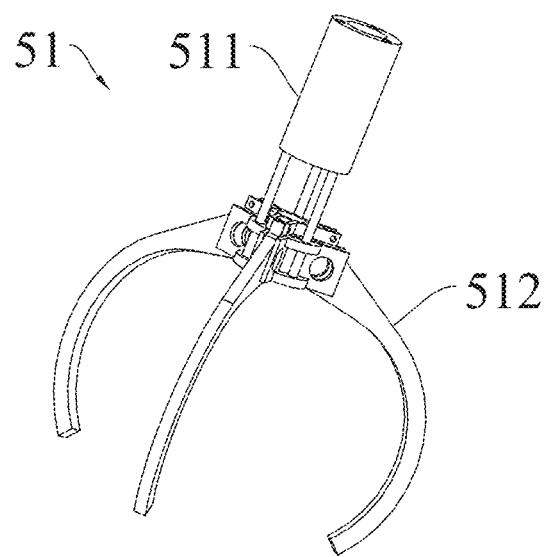
FIG. 7 is a structural schematic diagram of a passive catcher.

More specifically, as shown in FIG. 7, the present disclosure provides an implementation manner of a passive catcher 51. The passive catcher 51 includes a rod body 511, and a self-locking mechanism 512 for grabbing and locking the mission aerial vehicle 1 is arranged at a front end of the rod body 511. In one of the embodiments, the passive catcher 51 adopts a conventional mechanical claw for grabbing and locking; and after the mechanical claw is docked with the mission aerial vehicle 1, the claw of the mechanical claw is tightened and folded to fasten the mission aerial vehicle 1 to complete catching. In the catching process, the position and posture of the passive catcher 51 are realized through the driving of the guide arm 4.

Figure 8:
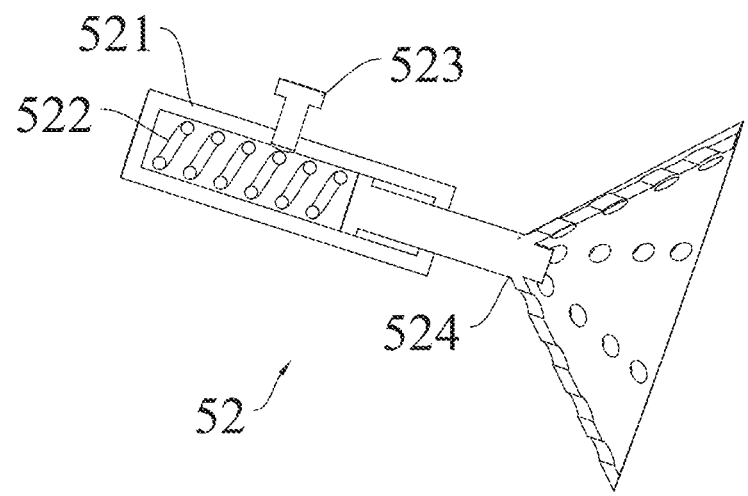
FIG. 8 is a structural schematic diagram of an active catcher.

For the active catcher 52, for example, to improve the catching ability of the guide arm 4 on the high-dynamic recovered mission aerial vehicle 1, the active catcher 52 may catch the mission aerial vehicle 1 through an impact mode. In one of the implementation manners, energy during ejection can be stored through energy storage; and during catching, the stored energy is released to drive the catcher to catch the mission aerial vehicle 1. For example, a spring is used as an energy storage component, and the spring is compressed through the relative movement between the ejected part and a movable sleeve. At the preset position, the ejected part is fixed by a controllable limiting block, and the spring is limited at the same time. When ejection is required, the limiting block is moved away electrically or by other driving modes, the elastic potential stored by the spring is released, and under the action of the elastic force of the spring, the ejected part of the catcher rushes to the mission aerial vehicle 1 for catching. Specifically, as shown in FIG. 8, in one of the embodiments, the active catcher 52 includes a shell 521 with a cylindrical cavity, a spring 522 is arranged in the cavity, a fixed end of the spring 522 is firmly connected to one end of the cavity, and a movable end of the spring 522 can reciprocate along an axis of the cavity to store and release the elastic potential. A limiting block 523 perpendicular to the axis of the cavity is arranged on the shell 521, and the limiting block 523 can be driven by an electrical signal to depart from a position where the ejected part is blocked. The active catcher 52 further includes an impact portion 524, the impact portion 524 includes a rod body matched with the cavity, a mechanism for grabbing and locking the mission aerial vehicle 1 is arranged at a front end of the rod body, and a configuration, such as a through hole, matched with the limiting block is arranged on the rod body. During energy storage assembling, a tail end of the rod body of the impact portion 524 abuts against the movable end of the spring 522, the spring 522 is pressed into the cavity for energy storage and then is inserted into the through hole in the rod body through the limiting block 523, and the impact portion 524 and the spring 522 in the energy storage state are locked in the cavity. When the impact portion is released, the limiting block 523 is moved away and the impact portion 524 is ejected for catching.

To make the carrier more compact and portable, in some embodiments, the hanging rack 3 and the cross beam 302 can be designed for convenient storage. For example, the upright column 301 of the hanging rack 3 may adopt a multi-stage telescopic rod structure with a self-tightening ability. When the required carrier enters a compact state, the upright column 301 is retracted and the cross beam 302 rotates, so that the hanging rack 3 is within the main outline range of the carrier. In addition, the upright column 301 and the cross beam 302 can be designed to be foldable to achieve the same effect. Further, the hanging rack 3 and other recovery-related apparatuses can be stored in the carrier to achieve a more compact effect.

Considering the existing condition of the application scenario, the fusion design of the system and the existing device can be achieved by virtue of the existing device, so that the system structure is optimized, and the construction cost can be reduced by the existing device. For example, all or some functions of the hanging rack 3 are achieved by virtue of existing street lamps, iron towers, bridges of ships and other devices with a certain height. Therefore, the hanging rack in the present application here only has a function, and is configured to provide suspended physical support for the catcher. The system can be constructed based on the existing facilities.

Figure 9:
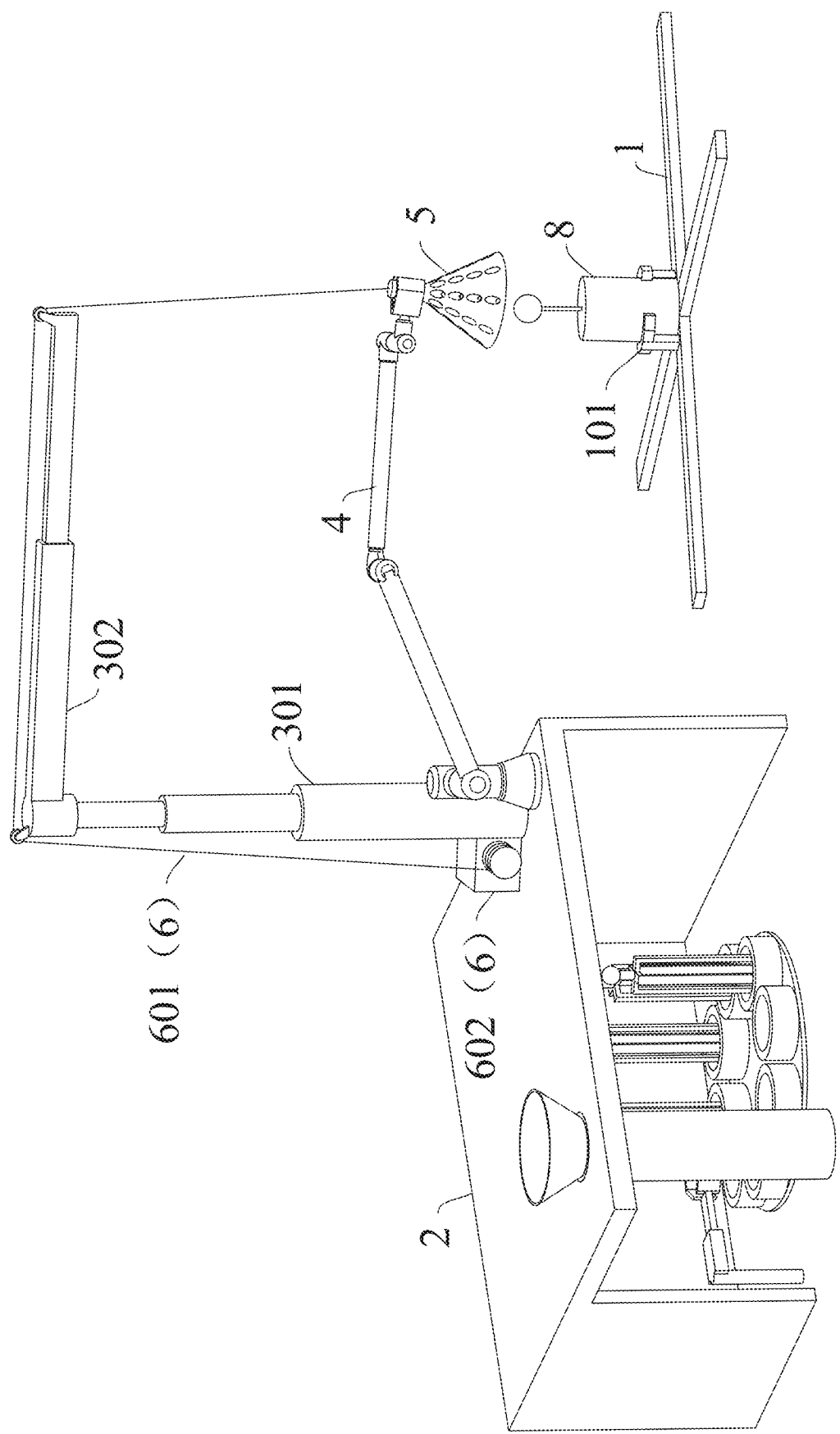
FIG. 9 is a schematic diagram of aerial cargo recovery.

In Embodiment 7, in combination with the above embodiments, the system also can recover cargoes carried on the aerial vehicle. In this way, the cargoes can be accurately delivered to the system without stopping the aerial vehicle. Specifically, as shown in FIG. 9, in some embodiments, in combination with Embodiment 4, a controllable clamping apparatus 101 is arranged on the mission aerial vehicle 1 and configured to clamp a cargo 8 or a container thereof and separate the cargo 8 or the container thereof from the aerial vehicle under a certain condition. A docking apparatus is arranged on the cargo 8 or the container thereof, and the docking apparatus can adopt the docking apparatus on the aerial vehicle in the above embodiments. The recovery process of the cargo or the container thereof is similar to the recovery process of the aerial vehicle. The details are not elaborated herein.

To improve the recovery efficiency, the system further includes an environment sensing device, and environment information is provided to the system through the environment sensing device. The environment sensing device includes at least one of an air speed measurement instrument, an air volume measurement instrument, a laser radar and a visual sensor, and the environment sensing device is electrically connected to the controller.

The recovering system of the present application recovers the aerial vehicle through the following steps:
Step 1: the guide arm 4 and the hanging rack 3 enter a position ready for recovery, and the guide arm 4 evades to avoid collision with the aerial vehicle in the next operation.
Step 2: the recovered mission aerial vehicle 1 flies close to a recovery point according to a combined navigation system thereof.
Step 3: after entering the sensing range of the states observation apparatus, the aerial vehicle starts an accurate fixed-point hovering mode by combining with information returned by the environment sensing device and hovers at the appointed point. In a case that conditions permit, the aerial vehicle can choose to land.
Step 4: the hanging rack 3 and the guide arm 4 enter a catching preparation position, so that after the catcher and the mission aerial vehicle 1 are docked, the guide arm 4 can rapidly enter a passive working state.
Step 5: the guide arm 4 drives the catcher to catch the mission aerial vehicle 1.
Step 6: after the catcher is docked with the mission aerial vehicle 1, the guide arm 4 enters the passive working state.
Step 7: the hanging rack 3 drives the mission aerial vehicle 1 to the appointed position of the storage system, and according to requirements, the mission aerial vehicle 1 can be chosen to be folded or not folded to enter the storage system.
Step 8: the storage system transfers the recovered mission aerial vehicle 1 to the storage position to complete the recovery and storage missions.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What is claimed is:

1. A system for recovering an aerial target by using a mechanical arm actuator in a non-bearing mode, comprising:
a hanging rack,
a catcher, hung on the hanging rack and configured to catch a target;
a guide arm, configured to guide the catcher to catch the target;
a states observation apparatus, configured to obtain a state of the target; and
a controller, electrically connected to the states observation apparatus and the guide arm,
wherein the controller obtains the state of the target through the states observation apparatus, and controls the guide arm to guide the catcher to catch the target in time;
wherein after the target is captured by the catcher, a servo drive of the guide arm is released to allow the guide arm to hang the target in a suspended form, and a load of the target on the guide arm is borne by a structural strength of the guide arm.

2. The system according to claim 1, wherein a fixed end of the guide arm is arranged on the hanging rack, the catcher is arranged at a free end of the guide arm.

3. The system according to claim 1, wherein the system further comprises a bearing cable arranged on a side surface of the guide arm, a first end of the bearing cable is connected to a fixed end of the guide arm, and a second end of the bearing cable is connected to an outer wall the catcher.

4. The system according to claim 3, wherein a jointing apparatus is arranged at a free end of the guide arm, and the jointing apparatus is connected to the catcher.

5. The system according to claim 3, wherein a length of the bearing cable is not greater than a length of the guide arm.

6. The system according to claim 1, wherein the guide arm is movably arranged on the hanging rack.

7. The system according to claim 1,
wherein the hanging rack comprises an upright column and a cross beam arranged at a top of the upright column;
the system further comprises a recovering cable and a cable driving apparatus, the cable driving apparatus is arranged at a bottom of the upright column of the hanging rack, a first end of the recovering cable is connected to the cable driving apparatus, a second end of the recovering cable is connected to an outer wall of the catcher,
and the hanging rack is arranged with a plurality of pulleys for the recovering cable to run over.

8. The system according to claim 1,
further comprising a storage system, the storage system comprising at least one storage position and a transfer apparatus for transferring a recovered target to the storage position, and the storage system being electrically connected to the controller.

9. The system according to claim 1,
wherein the catcher is an active catcher, the active catcher having an independent active movement ability and electrically connected to the controller.

10. The system according to claim 1,
wherein the catcher is a passive catcher, a movement ability of the catcher is determined by a dynamic performance of the guide arm.

11. The system according to claim 1,
further comprising an environment sensing device, the environment sensing device comprising at least one of an air speed measurement instrument, an air volume measurement instrument, a laser radar and a visual sensor, and
the environment sensing device being electrically connected to the controller.

12. The system according to claim 1,
wherein the hanging rack comprises a cross beam.

13. The system according to claim 12,
wherein the cross beam is capable of extending and retracting in a length direction thereof.

14. The system according to claim 1,
wherein the hanging rack comprises an upright column.

15. The system according to claim 14,
wherein the upright column is capable of extending and retracting in a length direction thereof.

16. The system according to claim 1,
wherein the hanging rack comprises an upright column and a cross beam arranged at a top of the upright column.

17. The system according to claim 16,
wherein the cross beam is capable of rotating around an axis of the upright column, and/or
the upright column is capable of extending and retracting in a length direction thereof, and/or
the cross beam is capable of extending and retracting in a length direction thereof.

18. A system for recovering an aerial target by using a mechanical arm actuator in a non-bearing mode, comprising:
a carrier;
a guide arm, hung on the carrier;
a catcher, hung on a free end of the guide arm;
wherein the guide arm is configured to guide the catcher to catch a target; and
wherein after the aerial target is captured by the catcher, the guide arm adjusts a movement state of the guide arm within a limited driving capacity range of the guide arm, and a load of the target on the guide arm is borne by a structural strength of the guide arm.

19. The system according to claim 18, comprising:
a carrier;
a guide arm, hung on the carrier;
a catcher, hung on a free end of the guide arm; and
a cable, wherein a first end of the cable extends upwards from the carrier and is connected to the catcher;
wherein the guide arm is configured to guide the catcher to catch a target; and
wherein after the catcher is captured by the catcher, the guide arm selectively releases the catcher to allow the target to be suspended on the cable.

* * * * *